US008364336B2

(12) United States Patent
Richter

(10) Patent No.: US 8,364,336 B2
(45) Date of Patent: Jan. 29, 2013

(54) METHOD FOR GUIDING A VEHICLE ALONG A PREDETERMINED PATH AS WELL AS VEHICLE AND SYSTEM FOR PERFORMING CRASH-TESTS

(75) Inventor: Richard Richter, Eresing (DE)

(73) Assignee: Tuv Sud Automotive GmbH, Munich (DE)

( * ) Notice: Subject to any disclaimer, the term of this patent is extended or adjusted under 35 U.S.C. 154(b) by 1706 days.

(21) Appl. No.: 10/586,676

(22) PCT Filed: Jan. 19, 2005

(86) PCT No.: PCT/EP2005/000494
§ 371 (c)(1),
(2), (4) Date: Jul. 20, 2006

(87) PCT Pub. No.: WO2005/071384
PCT Pub. Date: Apr. 8, 2005

(65) Prior Publication Data
US 2008/0234886 A1    Sep. 25, 2008

(30) Foreign Application Priority Data
Jan. 21, 2004  (DE) .............................. 110-2004-0087

(51) Int. Cl.
*G05D 1/02* (2006.01)
(52) U.S. Cl. ............ 701/25; 701/45; 73/12.04; 180/169
(58) Field of Classification Search ............ 701/25, 701/45, 23, 69, 78; 73/865.3–865.8; 180/268, 180/274, 282
See application file for complete search history.

(56) References Cited

U.S. PATENT DOCUMENTS

| | | | |
|---|---|---|---|
| 4,790,402 A * | 12/1988 | Field et al. | 180/169 |
| 5,187,664 A | 2/1993 | Yardley et al. | |
| 5,191,528 A * | 3/1993 | Yardley et al. | 701/23 |
| 5,216,605 A | 6/1993 | Yardley et al. | |
| 5,281,901 A | 1/1994 | Yardley et al. | |
| 5,338,206 A * | 8/1994 | Hupfer | 434/305 |
| 5,341,130 A | 8/1994 | Yardley et al. | |
| 5,469,928 A * | 11/1995 | Adler et al. | 180/6.28 |
| 5,483,845 A * | 1/1996 | Stein et al. | 73/865.3 |

(Continued)

FOREIGN PATENT DOCUMENTS

| | | |
|---|---|---|
| DE | 89 07 253.7 U1 | 8/1989 |
| DE | 196 05 553 C1 | 8/1997 |

(Continued)

OTHER PUBLICATIONS

Pilutti et. al., "Vehicle Steering Intervention Through Differential Braking" XP-002325942, Proceedings of the American Control Conference, vol. 3, 1995, pp. 1667-1671 (1995).

(Continued)

*Primary Examiner* — Thomas G Black
*Assistant Examiner* — Wae Louie
(74) *Attorney, Agent, or Firm* — Muncy, Geissler, Olds & Lowe, PLLC

(57) ABSTRACT

A method for guiding a driverless, multi-track vehicle along a predetermined path (12), which vehicle rolls on wheels (4, 6) separated from each other in the vehicle width direction, wherein the vehicle is steered by changing the torque applied to at least one of its wheels, such that it follows the predetermined path.

18 Claims, 2 Drawing Sheets

U.S. PATENT DOCUMENTS

| | | | | |
|---|---|---|---|---|
| 5,485,758 | A * | 1/1996 | Brown et al. | 73/865.8 |
| 5,626,362 | A * | 5/1997 | Mottola | 280/767 |
| 5,650,703 | A | 7/1997 | Yardley et al. | |
| 5,783,739 | A * | 7/1998 | Miller | 73/12.04 |
| 6,279,674 | B1 | 8/2001 | Lissel et al. | |
| 6,484,074 | B1 * | 11/2002 | Hazard et al. | 701/19 |
| 6,609,409 | B1 * | 8/2003 | Bock et al. | 73/12.01 |
| 6,622,541 | B2 * | 9/2003 | Stein et al. | 73/12.04 |
| 7,359,821 | B1 * | 4/2008 | Smith et al. | 702/113 |
| 7,380,436 | B2 * | 6/2008 | McCoy | 73/12.04 |
| 7,577,517 | B2 * | 8/2009 | Nagasawa | 701/200 |
| 2006/0207353 | A1 * | 9/2006 | McCoy | 73/865.6 |
| 2006/0278026 | A1 * | 12/2006 | Friedman et al. | 73/865.6 |
| 2008/0148878 | A1 * | 6/2008 | Crossman et al. | 73/866.4 |
| 2008/0234886 | A1 * | 9/2008 | Richter | 701/25 |

FOREIGN PATENT DOCUMENTS

| | | |
|---|---|---|
| EP | 0 445 671 A1 | 9/1991 |
| EP | 0 947 818 A2 | 10/1999 |
| JP | 60-62114 U | 5/1985 |
| JP | 05-223700 | 8/1993 |
| JP | 06-010404 | 1/1994 |
| JP | 08-044428 | 2/1996 |
| JP | 10-011140 | 1/1998 |
| JP | 10-187244 | 7/1998 |
| JP | 11-091609 | 4/1999 |
| JP | 11-231937 | 8/1999 |

OTHER PUBLICATIONS

Office Action from corresponding Japanese patent application 2006-550025, issued Jul. 27, 2010.

English translation of Office Action from corresponding Japanese patent application 2006-550025, issued Jul. 27, 2010.

* cited by examiner

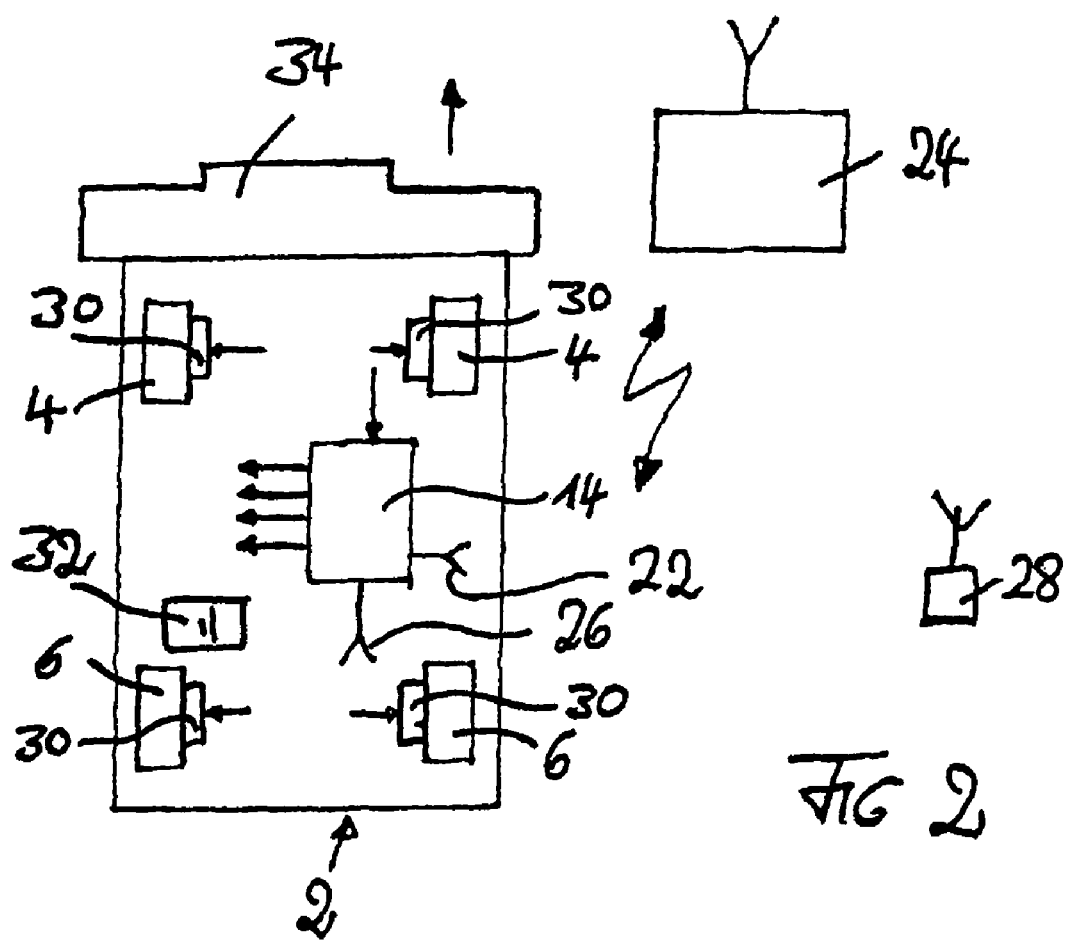

METHOD FOR GUIDING A VEHICLE ALONG A PREDETERMINED PATH AS WELL AS VEHICLE AND SYSTEM FOR PERFORMING CRASH-TESTS

This application is the US national stage filing of International Application No. PCT/EP2005/000494 filed Jan. 19, 2005, which claims priority to German patent application no. 10 2004 003 087.1 filed Jan. 21, 2004.

TECHNICAL FIELD

Background Art

The invention concerns a method for guiding a vehicle along a predetermined path. The invention further concerns a multi-track vehicle that is guidable along a predetermined path and a system for performing crash-tests by applying the inventive method and by using at least one inventive vehicle.

SUMMARY

Crash-tests are an essential tool during the development of a new vehicle, which crash-tests must fulfill numerous legal passenger-protection regulations and which should offer the passenger of the vehicle an optimal amount of passive security. A method for performing crash-tests is known from EP 0 445 671 B2, in which at least one driverless vehicle is guided to a previously-defined collision point, wherein the vehicle is moved under its own drive power by on-board control of the speed and driving direction along a predetermined drive path that is given by a guide device. Thus, the steering of the vehicle takes place via an actuator that operates the steering device of the vehicle, e.g., by direct intervention on the steering wheel. The installation of the corresponding actuator is relatively costly; moreover, a loss of the actuator as a result of a crash-test is connected with not insignificant costs.

The object underlying the invention is to create an option for performing crash-tests more cost-effectively than before.

In one aspect of the present teachings, methods are taught for guiding a driverless, multi-track vehicle along a predetermined path, which vehicle rolls on wheels separated from each other in the vehicle width direction, wherein the vehicle is steered such that the vehicle follows the predetermined path. The vehicle is preferably steered by changing the torque applied to at least one of its wheels. With this method, a separate steering actuator can be omitted, because the wheels of the vehicle are not turned to change the vehicle direction. Instead, varying torque is applied to the wheels to change the vehicle direction.

More preferably, at least one wheel is braked to change the vehicle direction. Furthermore, the drive torque of the vehicle is preferably increased in correspondence to the braking moment, so that the speed of the vehicle is not changed by a brake intervention for steering the vehicle. In this respect, at least two wheels disposed on different sides of the vehicle may be driven by their own motors whose drive torque is changed for steering the vehicle. More preferably, the drive torques of the motors may be changed such that the total drive torque of the vehicle remains constant during a steering intervention.

In another aspect of the present invention, a multi-track vehicle guidable along a predetermined path preferably includes at least one drive apparatus for driving at least one vehicle wheel. A braking apparatus is preferably provided for selective braking of at least two wheels disposed on different sides of the vehicle and a steering apparatus is preferably provided for changing the driving direction of the vehicle. A guiding device may ascertain a deviation of the actual path of the vehicle from a predetermined path and a control device preferably controls the operation of the vehicle such that the vehicle moves with a predetermined speed along the predetermined path. Even more preferably, the steering device may be formed by the braking apparatus that brakes the wheels when there is a deviation between the actual path and the predetermined path such that the deviation between the actual path and the predetermined path is minimized.

In a preferred embodiment of this aspect, the drive apparatus, the braking apparatus and the steering apparatus are preferably formed by at least two selectively controllable motors that drive the wheels disposed at different positions of the vehicle. The motors are preferably controlled by the control device such that, when there is a deviation between the actual path and the predetermined path, the vehicle changes its direction by selectively changing the moments acting upon the wheels such that the deviation decreases.

The vehicle may preferably carry a barrier designed for a collision with another vehicle.

In another aspect of the present teachings, a system for performing crash tests may be provided by applying one or more of the above-described methods and by using at least one of the above-described vehicles. In this case, a guide apparatus preferably defines a predetermined path and a speed control apparatus cooperates with the vehicle for controlling the vehicle speed such that the vehicle follows the predetermined path with a predetermined speed progression. The guide apparatus may preferably comprise a navigation apparatus that works by measuring distances between the vehicle and predetermined reference locations.

The invention can be used in all cases where the vehicle should be moved along a predetermined path in a driverless-manner. The application of the invention is advantageous where the radii of curvature of the curves, which the vehicle has to drive, are relatively large. The invention is particularly well suited for the cost-effective performance of crash-tests, with which it will be explained with schematic drawings in the following example.

BRIEF DESCRIPTION OF THE DRAWINGS

FIG. 2 shows a schematic drawing of a second embodiment of an inventive system.

DETAILED DESCRIPTION OF THE INVENTION

Figure 1:
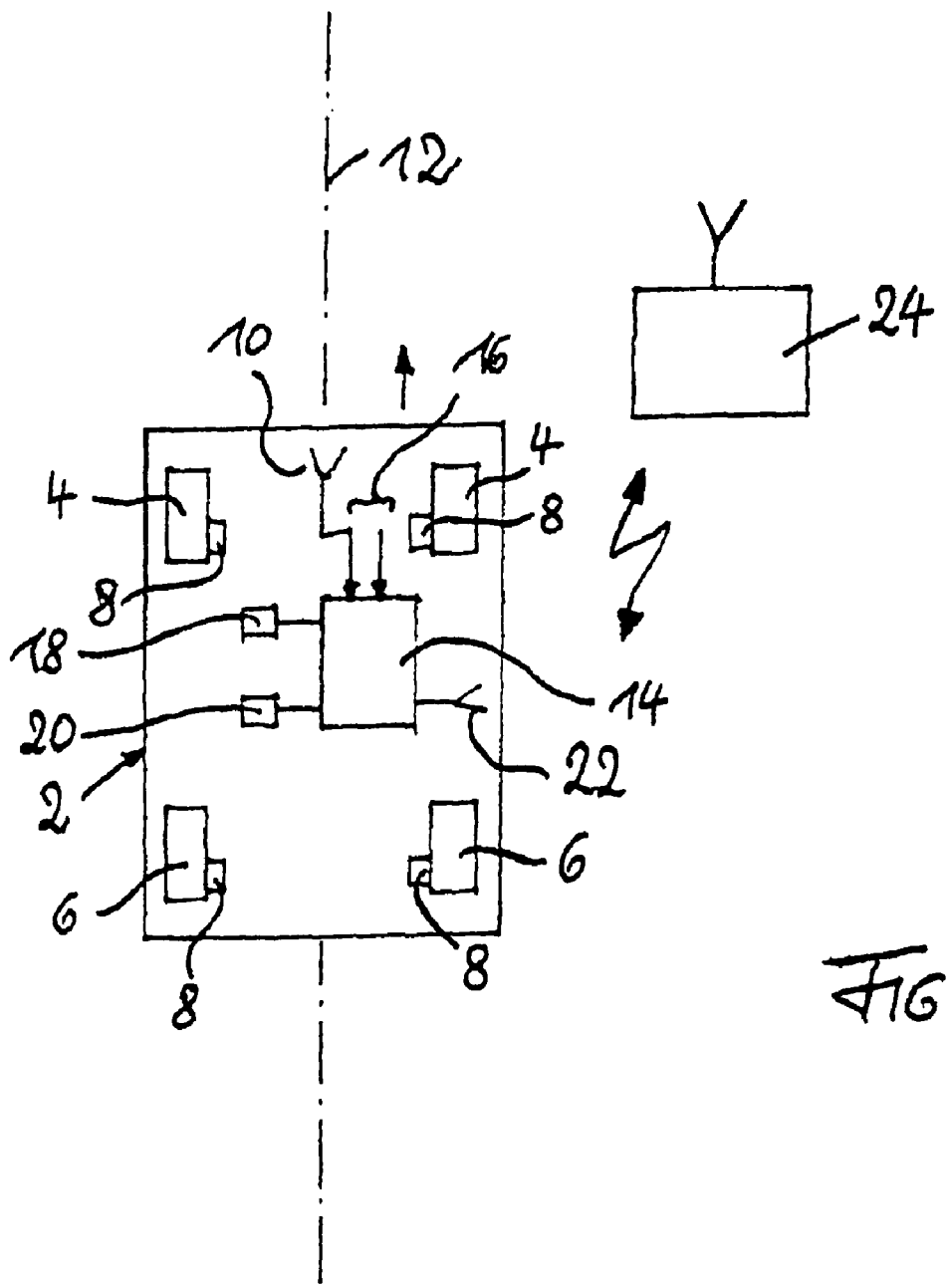
FIG. 1 shows a schematic drawing of a first embodiment of an inventive system.

As shown in FIG. 1, a vehicle, which is denoted as a whole with 2, includes front wheels 4 and rear wheels 6. The design of the vehicle can be known as a whole, which means e.g. a conventional automobile with a combustion motor, steering and so on. These conventional components are not shown. For braking of the vehicle, the wheels are provided with known wheel brakes 8.

For guiding along a predetermined path, the vehicle includes an antenna 10 or a known sensing device that operates in another way; the position of the vehicle can be detected by the antenna 10 in the lateral direction relative to a cable laid in the drive path. The vehicle further comprises a control device 14 that preferably includes a microprocessor with program- and data-memory. Inputs 16 of the control device 14 are connected with the antenna 10 and a signal transmitter that supplies a signal corresponding to the vehicle speed to the control device 14. Outputs of the control device 14 are connected with actuators 18 for the wheel brakes 8 (only one actuator is shown) and an actuator 20 for the operation of a charge controlling element of the not-illustrated internal combustion engine. The control device 14 communicates via an antenna 22, preferably with a central guide device 24 located externally of the vehicle.

The construction of the described components is known, such that their function will not be described in detail. With respect to the individual operation of the wheel brakes, the components known from vehicle stability control systems with brake intervention can be applied and controlled. In the following, the function of the entire system will be described in an exemplary manner.

It is assumed that an impact by the vehicle should be performed with a predetermined speed against an impediment disposed at a specified position of the path that is defined by the cable 12.

Pertinent data will then be input to a data memory of the control device 14 directly via a vehicle-affixed data input device or via the guide device 24, namely in the described example, the speed with which the vehicle should impinge upon the impediment.

The vehicle will then preferably be activated by the guide device 24, wherein the actuator 20 of the charge controlling member is operated such that the vehicle has already accelerated to the predetermined speed before the impediment, which speed is held at the predetermined value by means of the control device 14 and the actual vehicle speed supplied to an input of the control device 14. For example, the vehicle drives with steering such that the front wheels are locked in the straight-forward position. When there is a deviation of the actual path from the target path given by the cable, the wheel brakes 8 are operated via the actuators 18 such that the deviation between the actual path and the target path decreases and the vehicle is located along the target path, i.e. the vehicle moves such that the antenna 10 is located within a predetermined window over the cable 12. For example, when the actual position of the vehicle deviates to the left of its target position according to FIG. 1, the wheel brake 8 of the right front wheel is operated, whereby the vehicle curves to the right. It is also understood that both right-side brakes or only the brake of the right rear wheel can be operated. Advantageously, the charge controlling member of the internal combustion engine is further opened when one or more wheel brakes are actuated for a direction correction, so that the additional drive torque of the internal combustion engine compensates for the braking moment and the vehicle speed remains constant. The cooperation between the brake operation and necessary additional opening, e.g., of a throttle valve, can be stored in an engine operating map, which is stored in the data memory of the control device 14.

The steering is not required to be locked in the straight-forward position. When there is sufficient restoring torque, a locking with the device required therefor can be omitted, wherein costs are reduced. It is also possible to perform tests with the steering locked at a predetermined angle, so that the vehicle moves along a curved path without differing drive torque on its sides.

When a vehicle collision, vehicle against vehicle, should be performed with the inventive system, two vehicles can move on the guide cable 12 in a predetermined way under control of the guide device 24, wherein, in case the collision location should be predetermined, the time points, at which the vehicles driving towards each other are respectively located at predetermined positions of the route, will also be monitored. This can take place by providing the cable itself with electronic marks, by providing marks along the route or the position of the vehicle is telemetrically detected by the guide device 24 in a known manner.

By appropriate construction and attachment of the antenna 10, the vehicle can be guided to the cable 12 with a predetermined lateral offset, so that, by means of only one cable, crash-tests can be performed with different amounts of vehicle offset. It is further understood that vehicles can also move towards each other along different cables. The path provided by the cable 12 in the illustrated example can be replaced by various other devices, e.g., an optical marking on the path, such as a white stripe, whose position is analyzed by optical sensors of the vehicle, a guide beam that is sensed by sensors tuned to the respective frequency ranges, e.g. also a laser beam and so on. The use of a laser beam naturally has the disadvantage that the given path is straight.

The vehicle can be constructed in various ways; required for the suitability of the inventive method is that the vehicle can be braked such that it "pulls on one side", i.e. the vehicle's direction changes without the wheels being pivoted about an approximately vertical axis by a separate steering device. It is understood that the brakes are constructed such that the vehicle can be stopped by the guide device 24 when unpredicted events occur. The inventive type of "steering" can then also be applied when the vehicle does not move under its own drive power, but rather e.g. is pulled on a cable, rolled downhill and so on.

FIG. 2 shows a modified embodiment of the inventive system, with which the given path is provided by storing a path in the control device 14 in the form of a sequence of geographic data, whose compliance can be monitored by means of a known electronic navigation system. Extraordinarily high precision can be achieved with a so-called DGPS system, by which a GPS antenna 26 of the vehicle analyzes satellite data and data from an additional, stationary transmitter 28 in a known way. In the illustrated example, the known satellite navigation system is integrated into the control device 14. Alternately, the satellite navigation system can be connected to the control device 14 as its own unit. It is understood that the antenna 10 (FIG. 1) can be omitted when the vehicle is guided by means of a satellite navigation system. The navigation system is not required to be a satellite navigation system; it can be, most generally, a system, by which the respective position of the vehicle relative to reference points is ascertained, wherein the vehicle follows a given path, whose coordinate sequence is fixed based upon the reference system.

A further difference of the system of FIG. 2 in comparison to the system of FIG. 1 is that each vehicle wheel is driven by its own motor 30, e.g., an electric wheel hub motor, wherein the wheel hub motors are powered by a battery 32. The control device 14 controls the operation of the wheel hub motors 30, so that the vehicle 2 moves along the electronically-given path with a predetermined speed, wherein changes from the path are carried out by an appropriate change of the torques that are applied by the wheel hub motors 30 to the left-side and right-side vehicle wheels. When there is a rightward deviation of the vehicle from the given path, the right-side, front wheel hub motor 30 drives stronger and/or the left-side, front wheel hub motor 30 brakes. The braking by the wheel hub motor(s) on one side can be the same amount as the additional drive by the wheel hub motor(s) on the other side, so that the overall propulsion of the vehicle, and thus its speed, do not change.

It is understood that, instead of wheel hub motors, hydraulic, pneumatic or other motors also can be used that are supplied with energy by appropriate energy sources.

In the illustrated example, the vehicle 2 is, e.g., a simple carrier with wheels that are not steerable and/or pivotable, which vehicle carries a barrier 34 on its front side for performing side crash-tests on a stationary vehicle.

For suitable construction of the wheel hub motors 30, separate brakes could be omitted. However, the vehicle according to FIG. 2 advantageously includes wheel brakes that are applied, in particular, in the resting state.

It is understood that the features of the embodiment according to FIG. 1 can be combined with the features of the embodiment according to FIG. 2 and that numerous variations of the exemplary-illustrated embodiments are possible.

The signals required for controlling the respective actuators are evaluated by computers corresponding to control methods (for example, adjustment of a predetermined speed for a simple impact crash against a fixed impediment) and/or regulation methods (deviation from the predetermined side and/or given momentary position). The respective calculations can take place in a vehicle-affixed computer and/or in the central guide device 24.

REFERENCE NUMBER LIST

2 Vehicle
4 Front Wheel
6 Rear Wheel
8 Wheel Brake
10 Antenna
12 Cable
14 Control Device
16 Input
18 Actuator
20 Actuator
22 Antenna
24 Guide Device
26 GPS-Antenna
28 Transmitter
30 Motor
32 Battery
34 Barrier

The invention claimed is:

1. A system for performing vehicle crash tests, comprising:
a guide device for defining a predetermined path of a vehicle,
a speed guide device for defining a predetermined speed that the vehicle will achieve at least one location along the predetermined path and
a driverless, multi-track vehicle comprising:
at least one drive apparatus for driving at least one wheel of the vehicle,
at least one braking apparatus for selectively braking at least two wheels disposed on different sides of the vehicle,
a guiding device for calculating a deviation between the predetermined path and an actual path of the vehicle and
a control device for controlling the operation of the vehicle such that the vehicle is movable along the predetermined path with a speed that is predetermined for a crash location,
wherein the operation of the drive apparatus and/or the braking device is/are controllable by the control device such that, when there is a deviation between the actual path and the predetermined path, the direction of the vehicle is changeable by selectively changing the torques acting on the wheels such that the deviation decreases, and
wherein the drive apparatus and the braking apparatus are arranged and constructed to cooperate together such that the vehicle speed does not change as a result of a braking intervention for the purpose of converging the actual path with the predetermined path.

2. A system according to claim 1, wherein the control device is disposed in the vehicle and comprises a data memory, wherein values dependent on the operation of the wheel brakes are stored in the data memory for controlling an internal combustion engine of the vehicle such that a sum of the vehicle-driving moment of the internal combustion engine and the brake moment of the wheel brakes, which is applied for correcting the moving direction of the vehicle, remains approximately constant during the crash-test.

3. A system according to claim 1, wherein the drive apparatus and the braking apparatus are formed by at least two selectively-controllable motors arranged and constructed drive at least one wheel disposed on each side of the vehicle and are controllable by the control device such that, when there is a deviation between the predetermined path and the actual path, the vehicle changes its direction by selectively changing the moments acting upon the wheels, whereby the deviation decreases.

4. A system according to claim 3, wherein a barrier, which is arranged and constructed to collide with another vehicle, is attached to said vehicle.

5. A system according to claim 4, wherein the guide device comprises a navigation apparatus arranged and constructed to operate by measuring distances between the vehicle and predetermined reference locations.

6. A system according to claim 5, wherein the control device is arranged and constructed to control the vehicle speed such that the vehicle follows the predetermined path with a predetermined speed progression.

7. A system according to claim 1, wherein a barrier, which is arranged and constructed to collide with another vehicle, is attached to said vehicle.

8. A system according to claim 1, wherein the guide device comprises a navigation apparatus arranged and constructed to operate by measuring distances between the vehicle and predetermined reference locations.

9. A system according to claim 1, wherein the control device is arranged and constructed to control the vehicle speed such that the vehicle follows the predetermined path with a predetermined speed progression.

10. A method for performing vehicle crash tests using a system that comprises:
a guide device for defining a predetermined path of a vehicle,
a speed guide device for defining a predetermined speed that the vehicle will achieve at least one location along the predetermined path and
a driverless, multi-track vehicle comprising:
at least one drive apparatus for driving at least one wheel of the vehicle,
at least one braking apparatus for selectively braking at least two wheels disposed on different sides of the vehicle,
a guiding device for calculating a deviation between the predetermined path and an actual path of the vehicle and
a control device for controlling the operation of the vehicle such that the vehicle is movable along the predetermined path with a speed that is predetermined for a crash location,
the method comprising:
controlling the operation of the drive apparatus and/or the braking device such that, when there is a deviation between the actual path and the predetermined path, the direction of the vehicle is changed by selectively changing the torques acting on the wheels, whereby the deviation decreases, and wherein the drive apparatus and the braking apparatus are arranged and constructed to cooperate together such that the vehicle speed does not change as a result of a braking intervention for the purpose of converging the actual path with the predetermined path.

11. A method according to claim 10, wherein the control device is disposed in the vehicle and comprises a data memory, wherein values dependent on the operation of the wheel brakes are stored in the data memory for controlling an internal combustion engine of the vehicle, the method further comprising:

maintaining a sum of the vehicle-driving moment of the internal combustion engine and the brake moment of the wheel brakes, which is applied for correcting the moving direction of the vehicle, approximately constant during the crash-test.

12. A method according to claim 10, wherein the drive apparatus and the braking apparatus are formed by at least two selectively-controllable motors arranged and constructed drive at least one wheel disposed on each side of the vehicle and the method further comprises:

controlling the motors such that, when there is a deviation between the predetermined path and the actual path, the vehicle changes its direction by selectively changing the moments acting upon the wheels, whereby the deviation decreases.

13. A method according to claim 12, wherein a barrier, which is arranged and constructed to collide with another vehicle, is attached to said vehicle.

14. A method according to claim 13, wherein the guide device comprises a navigation apparatus arranged and constructed to operate by measuring distances between the vehicle and predetermined reference locations.

15. A method according to claim 14, further comprising controlling the vehicle speed such that the vehicle follows the predetermined path with a predetermined speed progression.

16. A method according to claim 10, wherein a barrier, which is arranged and constructed to collide with another vehicle, is attached to said vehicle.

17. A method according to claim 10, wherein the guide device comprises a navigation apparatus arranged and constructed to operate by measuring distances between the vehicle and predetermined reference locations.

18. A method according to claim 10, further comprising controlling the vehicle speed such that the vehicle follows the predetermined path with a predetermined speed progression.

* * * * *